US011976396B2

(12) United States Patent
Choi et al.

(10) Patent No.: US 11,976,396 B2
(45) Date of Patent: May 7, 2024

(54) METHOD FOR PRODUCING NONWOVEN FABRIC WITH IMPROVED FILTRATION PERFORMANCE

(71) Applicant: KOLON INDUSTRIES, INC., Seoul (KR)

(72) Inventors: Woo-seok Choi, Seoul (KR); Min-ho Lee, Seoul (KR); Hee-jung Cho, Seoul (KR); Young-shin Park, Seoul (KR); Jung-soon Jang, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 798 days.

(21) Appl. No.: 17/050,533

(22) PCT Filed: Jun. 11, 2019

(86) PCT No.: PCT/KR2019/007014
§ 371 (c)(1),
(2) Date: Oct. 26, 2020

(87) PCT Pub. No.: WO2019/245216
PCT Pub. Date: Dec. 26, 2019

(65) Prior Publication Data
US 2021/0189621 A1 Jun. 24, 2021

(30) Foreign Application Priority Data
Jun. 22, 2018 (KR) ........................ 10-2018-0071891

(51) Int. Cl.
*D04H 3/153* (2012.01)
*B01D 39/16* (2006.01)
(Continued)

(52) U.S. Cl.
CPC ........... *D04H 3/153* (2013.01); *B01D 39/163* (2013.01); *D01D 5/253* (2013.01); *D04H 3/011* (2013.01)

(58) Field of Classification Search
CPC .......... D01F 6/62; D04H 3/153; D04H 3/011; D04H 3/018; B01D 39/163;
(Continued)

(56) References Cited

U.S. PATENT DOCUMENTS 3,508,390 A * 4/1970 Bagnall et al. ........ D01D 5/253
428/397
2010/0269465 A1 10/2010 Choi et al.
(Continued)

FOREIGN PATENT DOCUMENTS

JP    0929021 A    2/1997
JP    11192406 A   7/1999
(Continued)

OTHER PUBLICATIONS

International Search Report dated Oct. 1, 2019.

*Primary Examiner* — Camie S Thompson
(74) *Attorney, Agent, or Firm* — Harvest IP Law, LLP

(57) ABSTRACT

The present disclosure relates to a method for producing a nonwoven fabric that improves filtration performance when applied as a filter material. By adjusting the modification ratio of the Y-shaped cross-section of polyester filaments constituting the nonwoven fabric, when applied to a filter by increasing a specific surface area of the nonwoven fabric, it increases the collection amount of the materials to be filtered and maintains a low differential pressure, thus enabling long-term use.

10 Claims, 1 Drawing Sheet

(51) Int. Cl.
  *D01D 5/253*  (2006.01)
  *D04H 3/011*  (2012.01)
(58) Field of Classification Search
  CPC ........ B01D 2239/0627; B01D 2239/10; B01D
        2239/0636; B01D 2239/1223; B01D
        2239/1291; D01D 5/253; Y10T 428/2395;
        Y10T 428/298; Y10T 428/2973; Y10T
        428/24446; Y10T 442/431; Y10T
        442/3122; Y10T 442/611
  USPC ........... 442/337, 309; 428/91, 401, 152, 397
  See application file for complete search history.

(56) References Cited

U.S. PATENT DOCUMENTS

| | | |
|---|---|---|
| 2015/0060354 A1 | 3/2015 | Hane et al. |
| 2017/0169809 A1* | 6/2017 | Takata ................. G10K 11/162 |

FOREIGN PATENT DOCUMENTS

| | | |
|---|---|---|
| JP | 2001-276529 A | 10/2001 |
| JP | 2003-003328 A | 1/2003 |
| JP | 2005113278 A | 4/2005 |
| JP | 2009-256819 A | 11/2009 |
| JP | 2018-003218 A | 1/2018 |
| JP | 2018054610 A | 4/2018 |
| KR | 10-951190 B1 | 4/2010 |
| KR | 10-2011-0034522 A | 4/2011 |
| KR | 10-1187382 B1 | 10/2012 |
| KR | 10-1802130 B1 | 7/2013 |
| KR | 20130077952 * | 7/2013 |
| KR | 10-2014-0130422 A | 11/2014 |
| KR | 10-2015-0132741 A | 11/2015 |
| KR | 1020160000508 A | 1/2016 |
| KR | 10-2018-0035962 A | 4/2018 |
| WO | 2013125583 A1 | 8/2013 |

* cited by examiner

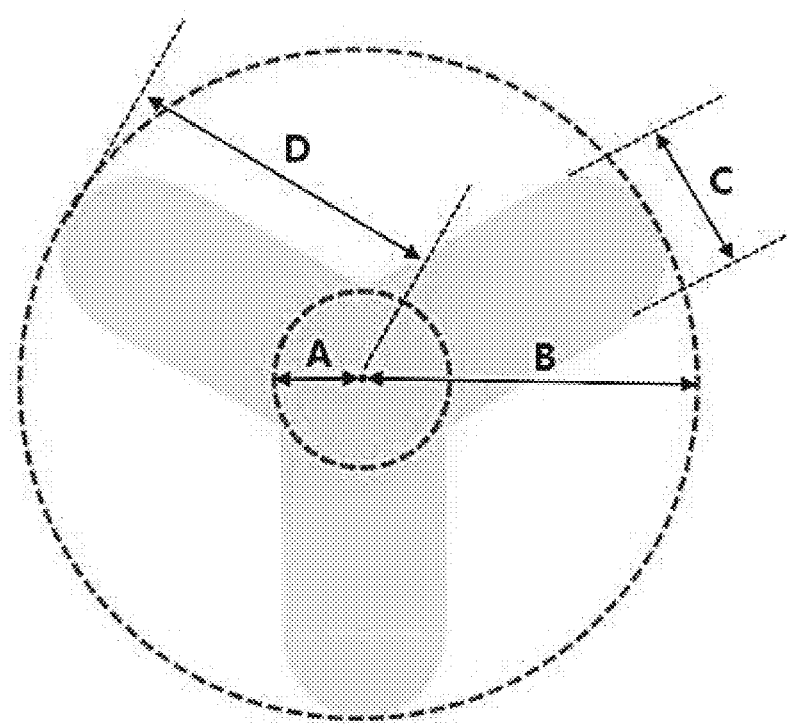

METHOD FOR PRODUCING NONWOVEN FABRIC WITH IMPROVED FILTRATION PERFORMANCE

CROSS REFERENCE TO RELATED APPLICATIONS

This application is a National Stage of International Application No. PCT/KR2019/007014 filed Jun. 11, 2019, claiming priority based on Korean Patent Application No. 10-2018-0071891 filed Jun. 22, 2018.

TECHNICAL FIELD

The present disclosure relates to a method for producing a nonwoven fabric that improves filtration performance when applied as a filter material.

BACKGROUND ART

A filter is defined as a material or device in which a pressure difference is created between both sides of a partition wall through which a gas or a liquid including different phases passes, thereby effectively separating different phase particles suspended therein from the gas or liquid.

The filter can block various contaminants including fine dust, bacteria, and viruses.

The filter is classified according to filtration targets such as air filters, water treatment filters, and gas filters.

Polyester spunbond nonwoven fabric has excellent mechanical properties, bendability, shape stability, and ease of workability, and thus is often used as a filter material for filters.

In the case of a pool & spa filter, it is a filter for water treatment that contains a polyester spunbond nonwoven fabric used in swimming pools, etc., and requires the capability of effectively removing various foreign materials in water and using it for a long time.

As a conventional filter material for water treatment, the polyester spunbond nonwoven fabric is composed of circular cross-sectional filaments having small fineness, so the surface area of the filaments constituting the nonwoven fabric is wide compared to the fabric, such that the filtration efficiency and the collection amount of various foreign substances are improved, but there is a problem that a differential pressure thereof is high and its life is short.

PRIOR ART LITERATURE

Patent Literature (Patent Literature 1) Korean Unexamined Patent Publication No. 2015-0132741 entitled "Wet-laid nonwoven fabric for filter paper with improved filtration efficiency and extended used period, and single fiber for the wet-laid nonwoven fabric"

DETAILED DESCRIPTION OF THE INVENTION

Technical Problem

The present disclosure has been made to solve the above problems, and it is therefore an object of the present disclosure to provide a method for producing a nonwoven fabric that improves the filtration performance by adjusting a specific surface area of the fibers constituting the nonwoven fabric.

Technical Solution

In order to achieve the above object, one aspect of the present disclosure provides a nonwoven fabric with improved filtration performance characterized by being a blended long-fiber nonwoven fabric including: a first filament of polyester having a melting point of 250° C. or more and a Y-shaped cross-section, and a second filament of polyester having a melting point of 150 to 220° C. and a circular cross-section, wherein the first filament has a cross-sectional area in a range of 0.11 to 0.20 mm$^2$ while having a modification ratio (defined by the ratio of a radius (B) of a circumscribed circle to a radius (A) of an inscribed circle) of a Y-shaped cross-section in a range of 2.0 to 3.2.

Another aspect of the present disclosure provides a method for producing a nonwoven fabric with improved filtration performance including the steps of: spinning and drawing a blend containing 80 to 95% by weight of a first filament of polyester having a melting point of 250° C. or more and 5 to 20% by weight of a second filament of polyester having a melting point of 150 to 220° C., to produce a blended yarn, wherein the first filament has a Y-shaped cross-section and has a cross-sectional area in a range of 0.11 to 0.20 mm$^2$ while having a modification ratio (defined by the ratio of the radius (B) of the circumscribed circle to the radius (A) of the inscribed circle) in the range of 2.0 to 3.2; laminating the blended yarn to form a web; and performing a calendering process of thermally bonding the web by passing it through calender rollers, thereby producing the nonwoven fabric.

Advantageous Effects

According to the present disclosure, by adjusting the modification ratio of the Y-shaped cross-section of polyester filaments constituting the nonwoven fabric, when applied to a filter by increasing a specific surface area of the nonwoven fabric, it increases the collection amount of materials to be filtered and maintains a low differential pressure, thus enabling long-term use.

BRIEF DESCRIPTION OF THE DRAWING

FIG. 1 is a schematic diagram of a Y-shaped cross-section of a first filament of polyester according to an embodiment of the present disclosure.

DETAILED DESCRIPTION OF THE EMBODIMENTS

According to the present disclosure, in the long-fiber spunbond nonwoven fabric composed of two types of polyester fibers having different melting points and cross-sectional shapes, a nonwoven fabric which improves the filtration performance when applied as a filter material, by increasing a specific surface area of the nonwoven fabric through the adjustment of the cross-section of the fibers, is provided.

The fibers constituting the nonwoven fabric of the present disclosure is a blended yarn produced by spinning and drawing a blend containing 80 to 95% by weight of a first filament of polyester having a melting point of 250° C. or more and 5 to 20% by weight of a second filament of polyester having a melting point of 150 to 220° C. and a circular cross-section.

The first filament may be a polyester having a melting point of 250° C. or more, or 255° C. or more, or 250 to 260° C., or 255 to 260° C., and a Y-shaped cross-section.

The first filament may have fineness of 3 to 7 denier.

If the fineness of the first filament is less than 3 denier, a lot of yarn breakages occur and spinning workability deteriorates, and if the fineness of the first filament is more than 7 denier, an aggregation phenomenon of filaments occurs due to insufficient cooling, the spinning workability is deteriorated, and the nonwoven web is continuously formed, making it difficult to maintain uniformity.

An example of the Y-shaped cross-section of the first filament is as shown in FIG. 1 below The Y-shaped cross-section of the yarn of the first filament can be produced by adjusting the modification ratio (defined by the ratio of the radius (B) of the circumscribed circle to the radius (A) of the inscribed circle) of the filament cross-section through adjustment of the width (C) and the arm length (D) of the Y-shaped section in a spinneret nozzle from which the polyester polymer is discharged, and controlling the spinning stability through adjustment of the cross-sectional area of the nozzle hole.

It is preferable that the modification ratio of the Y-shaped cross-section of the present disclosure is 2.0 to 3.2, or 2.1 to 3.0, and the cross-sectional area is 0.11 to 0.20 mm$^2$, or 0.12 to 0.19 mm$^2$, or 0.123 to 0.189 mm$^2$. If the modification ratio of the Y-shaped cross-section yarn is 3.2 or more or the cross-sectional area is less than 0.11 mm$^2$, the spinneret pressure increases excessively during spinning, causing deformation and damage to the spinneret. And if the modification ratio is less than 2.0 or the cross-sectional area is 0.20 mm$^2$ or more, the spinnability of the filament is deteriorated and at the same time, performance (filtration efficiency, pressure loss) may be deteriorated when applied to a filter.

The second filament has fineness of 1 to 5 denier and a circular cross-section.

The second filament may be a polyester having a melting point of 150 to 220° C., or 180 to 220° C., or 190 to 220° C., or 200 to 220° C., or 150 to 210° C., or 180 to 210° C., or 190 to 210° C., or 200 to 210° C., or 205 to 210° C., and having a circular cross-section.

The melting point of the first filament may be higher than the melting point of the second filament by 40° C. or more, or 45° C. or more, or 40° to 50° C., or 45 to 50° C. That is, a difference value obtained by subtracting the melting point of the second filament from the melting point of the first filament may be 40° C. or more, or 45° C. or more, or 40 to 50° C., or 45 to 50° C.

When the difference value obtained by subtracting the melting point of the second filament from the melting point of the first filament decreases to less than 40° C., the formability in a high temperature environment may be reduced.

The nonwoven fabric may include 80 to 95% by weight of the first filament of polyester having a melting point of 250° C. or more and a Y-shaped cross-section, and 5 to 20% by weight of the second filament of polyester having a melting point of 150 to 220° C. and a circular cross-section.

If the content ratio of the second filament in the nonwoven fabric is less than 5% by weight, the mechanical strength of the nonwoven fabric may decrease due to insufficient bonding force between filaments.

If the content ratio of the second filament is more than 20% by weight, aggregation of filaments may occur due to insufficient cooling of filaments during blend-spinning, which results in a reduction in spinning workability, and there is a limit to the increase of the specific surface area of the nonwoven fabric, which is not preferable.

When producing the blended yarn, the filament in which the two-component polyester is spun in the form of blended yarn can be sufficiently drawn at a draw speed of 4500 to 5500 m/min using a high-pressure air drawing device.

At this time, if the drawing speed is less than 4500 m/min, the crystallinity of the filament is low, and the tenacity and strength of the nonwoven fabric are reduced, and if the drawing speed exceeds 5500 m/min, the filaments slip by drawing air and are entangled with adjacent filaments, which may cause a reduction in the uniformity of the nonwoven fabric.

Then, a step of laminating the blended yarn to form a web is performed.

At this time, the web is formed by laminating the blended yarn on a continuously moving conveyor net in a conventional manner.

Then, by performing a calendering process of passing the web through calendering rollers and subjecting it to hot air treatment, the filaments are thermally bonded, and thereby the strength of the nonwoven fabric is imparted, and the nonwoven fabric is imparted with appropriate smoothness and thickness.

At this time, the calendering rollers are heated to a temperature capable of exhibiting an adhesive function by melting the second filament.

The present disclosure focuses on the fact that the surface area of the fiber is determined by the shape of the filaments constituting the nonwoven fabric, and is a technique utilizing that when the filaments have the same thickness, the filament cross-section is not circular shape but other shape, that is, when it is in a modified shape, the surface area of the fiber is widened.

That is, a polyester spunbond nonwoven fabric composed of a first filament having a modified cross-section and a second filament having a circular cross-section is produced, and if the nonwoven fabric thus produced is applied as a filter for water treatment used in swimming pools, etc., the collection amount of various foreign materials is increased due to the increase of the specific surface area of the nonwoven fabric, and the life of the filter can be improved by reducing the differential pressure.

Hereinafter, the present disclosure will be described in more detail with reference to the following examples and comparative examples.

However, the following examples are for illustrative purposes only, and the present disclosure is not limited thereby. It will be apparent to those of ordinary skill in the art that substitutions and other equivalent modifications can be made to the invention without departing from the technical spirit of the present disclosure.

Example 1

Polyethylene terephthalate (PET) having a melting point of 255° C. as the first filament and copolymerized polyester (CoPET) having a melting point of 210° C. as the second filament were melted at a spinning temperature of 285° C. using a continuous extruder, respectively.

Subsequently, each melt was discharged through spinneret capillary holes allowing the first filament to form a modified cross-section of Table 1 below and allowing the second filament to form a circular cross-section, and the discharged continuous filaments were solidified with cooling air and then drawn at a spinning speed of 5000 m/min using a high-pressure air drawing device to produce filament fibers.

At this time, the filament fibers were blend-spun so that the content ratio of the first filament and the second filament was 80:20 wt %, thereby producing a blended yarn. The discharge amount and the number of spinneret capillary holes were adjusted so that the fineness of the first filament was as shown in Table 1 below, and the fineness of the second filament was 3 denier.

Next, the blended yarn was continuously laminated in the form of a web on a conveyor net, then passed between calender rollers preheated to 130° C. in a conventional method, and subjected to a calendering process of hot air bonding, and thereby a nonwoven fabric having a weight per unit area of 100 g/m$^2$ (gsm), and a thickness of 0.43 mm was produced.

[Examples 2 to 3] and [Comparative Examples 1 to 4]

A nonwoven fabric was produced in the same manner as in Example 1, except that the first filament was formed as shown in Table 1 below.

TABLE 1

| Category | Cross-section of first filament | Fineness of first filament (De) | Width (C) (mm) | Length (D) (mm) | D/C | Cross-sectional area of fist filament (mm$^2$) | B/A (modification ratio) |
|---|---|---|---|---|---|---|---|
| Example 1 | Y-shaped | 3 | 0.09 | 0.55 | 6.1 | 0.137 | 2.5 |
| Example 2 | Y-shaped | 5 | 0.08 | 0.59 | 6.9 | 0.123 | 3.0 |
| Example 3 | Y-shaped | 7 | 0.12 | 0.58 | 4.8 | 0.189 | 2.1 |
| Comparative Example 1 | ○ (circular) | 3 | 0.30 | 0.30 | 1.0 | 0.145 | 1.0 |
| Comparative Example 2 | Y-shaped | 5 | 0.07 | 0.55 | 7.9 | 0.109 | 3.7 |
| Comparative Example 3 | Y-shaped | 1 | 0.09 | 0.55 | 6.1 | 0.137 | 2.5 |
| Comparative Example 4 | Y-shaped | 3 | 0.15 | 0.55 | 3.7 | 0.216 | 1.5 |

The properties of the nonwoven fabrics of the examples and comparative examples were measured using the following test method, and the results are shown in Table 2 below.

1. Measurement of the Modification Ratio of the First Filament and the Ratio of Width and Length The width and arm length of the modified (Y-shaped) filament were calculated through a scanning electron microscope (SEM) cross-sectional image to measure the modification ratio and the ratio.

2. Measurement of the Specific Surface Area of the First Filament

It was measured using the method of ASTM F316.

A specimen having a diameter of 2 cm was fixed to the measuring unit using ESA measuring equipment from Porous Materials Inc. and the fixed specimen was passed through a fluid having a viscosity of 0.019 cP, and the specific surface area of the specimen was measured at a flow rate according to the pressure.

3. Filtration Performance of Nonwoven Fabric

The filtration performance of the nonwoven fabric was evaluated using TOPAS AFC-131 (air filter filtration performance device).

It was measured at a wind speed of 75.6 m$^3$/h using a specimen with width×length=0.525×0.225 cm as a filter media. At this time, dust particles used were ISO-12103-1 A2 Fine TEST Dust, and the concentration was 20 mg/m$^3$.

3-1. Collection Rate

When the dust particles of 3.0 to 5.0 in were passed through the filter media, the collection rate of the filter media was measured.

3-2. Pressure Loss (Pa)

The initial pressure loss before and after passing through the filter media at a wind speed of 75.6 m$^3$/h (RS K 0011) was measured.

3-3. D.H.C (Dust Holding Capacity):

At the same sample standard and wind speed, when the concentration of dust particles was set to 70 mg/m$^3$ and the final pressure reached 100 Pa, the weight of dust particles collected in the filter was measured (RSK K 0011).

3-4. Filtration Time

At the same sample standard and wind speed, the concentration of dust particles was set to 70 mg/m$^3$, and the time until the final pressure reached 100 Pa was measured.

The longer this time, the longer the service life of the nonwoven fabric in the filter.

TABLE 2

| | | | Filtration performance | | | |
|---|---|---|---|---|---|---|
| Category | Specific surface area (m$^2$/g) | D.H.C (g/m$^2$) | Collection rate (%) (3.0~5.0 μm) | Pressure loss (ΔP) | Filtration time * (min) | Spinnability * |
| Example 1 | 0.24 | 18.1 | 90.2 | 4.2 | 31 | ⊚ |
| Example 2 | 0.28 | 21.8 | 84.2 | 3.4 | 37 | ○ |
| Example 3 | 0.25 | 22.9 | 81.4 | 2.4 | 44 | ○ |
| Comparative Example 1 | 0.14 | 12.8 | 84.2 | 8.6 | 9 | Δ |
| Comparative Example 2 | 0.31 | 15.2 | 94.5 | 1.9 | 56 | × |
| Comparative Example 3 | 0.16 | 16.8 | 95.2 | 6.8 | 18 | Δ |
| Comparative Example 4 | 0.16 | 28.3 | 74.2 | 8.6 | 9 | × |

* Spinnability evaluation criteria

⊚: The occurrence of yarn breakage is very small, and normal filaments are continuously laminated on the net to form a very uniform nonwoven fabric.
○: The occurrence of yarn breakage is very small, and normal filaments are continuously laminated on the net to form a relatively uniform nonwoven fabric.
Δ: Yarn breakages frequently occur and the filaments are not normal, but a nonwoven fabric can be formed.
×: Yarn breakages very frequently occur, the filaments are not normal, and thus the formation of a nonwoven fabric is difficult.

From the results of Table 2, it is confirmed that when the modification ratio is within the range of the present disclosure, the performances of the collection amount, filtration efficiency, pressure loss, and filtration time are expressed in a balanced manner.

On the other hand, if the modification ratio is too large, the specific surface area also becomes too wide, and the collection amount is rather reduced (see Comparative Example 2). If the modification ratio is too small, it is confirmed that the specific surface area also becomes too narrow, so that the collection amount increases, but the pressure loss and filtration efficiency deteriorate (see Comparative Example 2).

EXPLANATION OF REFERENCE NUMERALS

A: Radius of inscribed circle in Y-shaped section
B: Radius of circumscribed circle
C: Width of Y-shaped section
D: Length of Y-shaped section

The invention claimed is:

1. A nonwoven fabric with improved filtration performance characterized by being a blended long-fiber nonwoven fabric comprising: a first filament of polyester having a melting point of 250° C. or more and a Y-shaped cross-section, and a second filament of polyester having a melting point of 150 to 220° C. and a circular cross-section,
   wherein the first filament has a cross-sectional area in the range of 0.11 to 0.20 mm$^2$ while having a modification ratio (defined by the ratio of a radius (B) of a circumscribed circle to a radius (A) of an inscribed circle) of the Y-shaped cross-section in a range of 2.0 to 3.2,
   wherein a specific surface area of the nonwoven fabric is 0.2 to 0.3 m$^2$/g.

2. The nonwoven fabric with improved filtration performance according to claim 1, wherein the first filament has fineness of 3 to 7 denier.

3. The nonwoven fabric with improved filtration performance according to claim 1, comprising 80 to 95% by weight of the first filament of polyester having a melting point of 250° C. or more and a Y-shaped cross-section, and 5 to 20% by weight of the second filament of polyester having a melting point of 150 to 220° C. and a circular cross-section.

4. The nonwoven fabric with improved filtration performance according to claim 1, wherein the second filament has fineness of 1 to 5.

5. The nonwoven fabric with improved filtration performance according to claim 1, wherein the melting point of the first filament is higher than the melting point of the second filament by 40° C. or more.

6. A method for producing a nonwoven fabric with improved filtration performance comprising the steps of:
   spinning and drawing a blend containing 80 to 95% by weight of a first filament of polyester having a melting point of 250° C. or more and 5 to 20% by weight of a second filament of polyester having a melting point of 150 to 220° C. to produce a blended yarn, wherein the first filament has a Y-shaped cross-section and the nonwoven fabric has a cross-sectional area in the range of 0.11 to 0.20 mm$^2$ while having a modification ratio (defined by a ratio of a radius (B) of a circumscribed circle to a radius (A) of an inscribed circle) in a range of 2.0 to 3.2;
   laminating the blended yarn to form a web; and
   performing a calendering process of thermally bonding the web by passing it through calender rollers, thereby producing the nonwoven fabric,
   wherein a specific surface area of the nonwoven fabric is 0.2 to 0.3 m$^2$/g.

7. The method for producing a nonwoven fabric with improved filtration performance according to claim 6, wherein the first filament has fineness of 3 to 7 denier.

8. The method for producing a nonwoven fabric with improved filtration performance according to claim 6, wherein the second filament has fineness of 1 to 5 denier and a circular cross-section.

9. The method for producing a nonwoven fabric with improved filtration performance according to claim 6, wherein the melting point of the first filament is higher than the melting point of the second filament by 40° C. or more.

10. The method for producing a nonwoven fabric with improved filtration performance according to claim 6, wherein the calender roller is heated to a temperature capable of melting the second filament to exhibit an adhesive function.

* * * * *